United States Patent
Chen et al.

(10) Patent No.: US 9,287,774 B2
(45) Date of Patent: Mar. 15, 2016

(54) POWER CONVERTER CONTROL CIRCUIT

(71) Applicant: Richtek Technology Corporation, Chupei, Hsinchu (TW)

(72) Inventors: Ching-Jan Chen, Taipei (TW); Shao-Hung Lu, Taoyuan (TW); Jian-Rong Huang, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 248 days.

(21) Appl. No.: 14/204,092

(22) Filed: Mar. 11, 2014

(65) Prior Publication Data

US 2014/0253084 A1    Sep. 11, 2014

(30) Foreign Application Priority Data

Mar. 11, 2013 (TW) .............................. 102108558 A (51) Int. Cl.
  *G05F 1/00* (2006.01)
  *H02M 3/156* (2006.01)
(52) U.S. Cl.
  CPC ..................................... *H02M 3/156* (2013.01)
(58) Field of Classification Search
  CPC ....................................................... H02M 3/156
  USPC ................................................... 323/222, 293
  See application file for complete search history.

(56) References Cited

U.S. PATENT DOCUMENTS

| 7,777,464 B2 * | 8/2010 | Jung et al. ..................... 323/275 |
| 8,018,201 B2 | 9/2011 | Lohr |
| 2012/0025792 A1 | 2/2012 | Lipcsei et al. |

* cited by examiner

*Primary Examiner* — Adolf Berhane
*Assistant Examiner* — Afework Demisse
(74) *Attorney, Agent, or Firm* — Birch, Stewart, Kolasch & Birch, LLP (57) ABSTRACT

A power converter control circuit includes a feedback circuit and a pulse width modulation signal generating circuit for configuring a power stage circuit to provide power to a load. The feedback circuit generates a first gain signal and a second gain signal according to an output voltage sensing signal coupled with the load. The feedback circuit further generates a feedback signal according to the first gain signal and the second gain signal. The pulse width modulation signal generating circuit configures the operation of the power stage circuit according to the feedback signal and a reference signal. Moreover, the feedback circuit and the pulse width modulation signal generating circuit are configured on the same integrated circuit package.

11 Claims, 10 Drawing Sheets

POWER CONVERTER CONTROL CIRCUIT

CROSS-REFERENCE TO RELATED APPLICATIONS

This application claims the benefit of priority to Patent Application No. 102108558, filed in Taiwan on Mar. 11, 2013; the entirety of which is incorporated herein by reference for all purposes.

BACKGROUND

The disclosure generally relates to a power converter circuit and, more particularly, to the control circuit of the power converter circuit.

In many system designs, the power converter circuit must accurately and stably provide the power signal to ensure the correct operations of the system. The power converter circuit may adjust its operation by utilizing the feedback circuit or other suitable circuit structures for enhancing the stability and the accuracy of the power signal. For example, the filter circuit may be utilized as the feedback circuit in the power converter circuit.

The control circuit of the power converter circuit is usually realized with integrated circuit elements for reducing the hardware dimension. Some control circuits, however, need to place some of the circuit components outside the integrated circuit package of the control circuit (e.g., utilizing discrete circuit elements) to easily adjusting the gain, the frequency response, etc. of the feedback circuit. When the feedback circuit is placed outside the integrated circuit package of the control circuit, the dimension of the power converter increases and the dimension of the electronic product may not be effectively reduced. Moreover, the integrated circuit package of the control circuit needs to couple with the outside feedback circuit through the pin of the integrated circuit. The pin number of the integrated circuit package increases accordingly and a larger integrated circuit package might be needed. Therefore, the hardware dimension and the hardware cost increase when the feedback circuit is placed outside the integrated circuit package of the control circuit.

When the feedback circuit is placed in the integrated circuit package of the control circuit, the characteristic of the circuit elements of the feedback circuit may deviate from the required value during the manufacturing process of the integrated circuit elements. Sophisticated mechanism may be needed to adjust the feedback circuit to ensure the correct operations of the feedback circuit. For example, the pole or the zero of the feedback circuit may drift away from the designed value and the characteristic of the feedback circuit deteriorates because of the variation of the impedance value of the circuit elements in the feedback circuit. Thus, the impedance value of the circuit elements in the feedback circuit needs to be adjusted to ensure the feedback circuit operating correctly. When the feedback circuit is placed in the integrated circuit package of the control circuit, the pole or the zero of the feedback circuit may not be adjusted or not be adjusted accurately. The performance or the power converter circuit may therefore be affected and even not function normally. Moreover, when the feedback circuit is placed in the integrated circuit package of the control circuit, some of the circuit elements (e.g., the capacitors) may occupy a huge hardware area when implemented with integrated circuit elements. The hardware dimension therefore still may not be reduced effectively.

SUMMARY

In view of the foregoing, it may be appreciated that a substantial need exists for methods and apparatuses that mitigate or reduce the problems above.

An example embodiment of a control circuit for a power converter is disclosed, for configuring a power stage circuit to provide power to a load, comprising: a feedback circuit, configured to operably generate a first gain signal and a second gain signal according to a voltage sensing signal coupled with a load and generate a feedback signal according to the first gain signal and the second gain signal; and a pulse width modulation signal generating circuit, coupled with the feedback circuit, configured to operably configure the power stage circuit according to the feedback signal and a reference signal; wherein the feedback circuit and the pulse width modulation signal generating circuit are configured in the same integrated circuit package.

Another example embodiment of a control circuit for a power converter is disclosed, for configuring a power stage circuit to provide power to a load through a inductor, comprising: a feedback circuit, configured to operably generate a third gain signal and a fourth gain signal according to a voltage sensing signal coupled with a load, a first channel current sensing signal and a second channel current sensing signal, and generate a feedback signal according to the third gain signal and the fourth gain signal; and a pulse width modulation signal generating circuit, coupled with the feedback circuit, configured to operably configure the power stage circuit according to the feedback signal and a reference signal; wherein the feedback circuit and the pulse width modulation signal generating circuit are configured in the same integrated circuit package.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
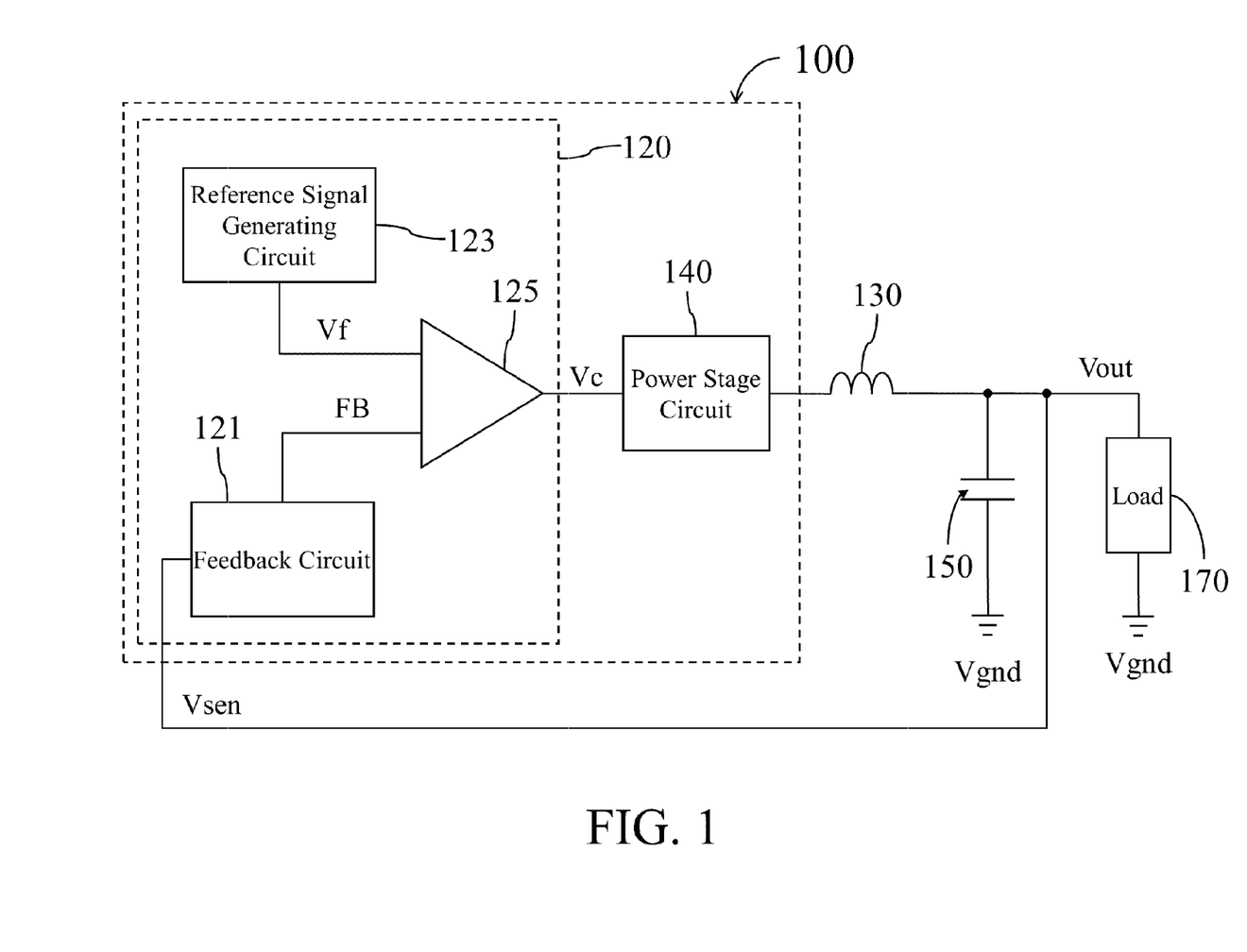
FIG. 1 shows a simplified functional block diagram of a power converter circuit according to one embodiment of the present disclosure.

FIG. 1 shows a simplified functional block diagram of a power converter circuit 100 according to one embodiment of the present disclosure. The power converter circuit 100 comprises a control circuit 120 and a power stage circuit 140. The control circuit 120 may configures the power stage circuit 140 by utilizing one or more control signals Vc to provide a voltage signal Vout to a load 170 through an inductor 130 and a capacitor 150. Moreover, the control circuit 120 is coupled with the load 170 for receiving a voltage sensing signal Vsen, which is corresponding to the output voltage signal Vout, for adjusting the operations of the control circuit 120 accordingly. For the purposes of conciseness and clear explanation, other components and connections of the power converter circuit 100 are not shown in FIG. 1. In the embodiment in FIG. 1, the capacitor 150 and the load 170 are coupled with the voltage level of the ground Vgnd for conciseness. In other embodiment, the capacitor 150 and the load 170 may be configured to be coupled with the same or different voltage levels.

In the embodiment in FIG. 1, the control circuit 120 comprises a feedback circuit 121, a reference signal generating circuit 123 and a pulse width modulation signal generating circuit 125.

The feedback circuit 121 may be realized with suitable active circuit elements and/or passive circuit elements to generate a feedback signal FB according to the voltage sensing signal Vsen.

The reference signal generating circuit 123 is configured to operably generate a periodic or non-periodic reference signal Vf. For example, the reference signal generating circuit 123 may generate sinusoidal signals, square wave signals, ramp signals and other suitable periodic and/or non-periodic signals to be the reference signal Vf. The reference signal generating circuit 123 may be realized with signal processors, microcontrollers, active circuit elements and/or passive circuit elements.

The pulse width modulation signal generating circuit 125 is coupled with the feedback circuit 121 and the reference signal generating circuit 123, and configured to operably generate a control signal Vc according to the feedback signal FB and the reference signal Vf for configuring the operations of the power stage circuit 140. The pulse width modulation signal generation circuit 125 may be realized with comparator circuits, signal processors, microcontrollers, active circuit elements and/or passive circuit elements with a suitable gain, and may therefore generate the pulse width modulated control signal Vc according to the feedback signal FB and the reference signal Vf.

The power stage circuit 140 comprises one or more transistors which may be respectively coupled with the same of different voltage level or coupled with other circuit elements. The transistor in the power stage circuit 140 are configured to be conducted or not conducted for providing the required output voltage signal Vout to the load 170 through the inductor 130 and the capacitor 150 according to the control signal Vc generated by the pulse width modulation signal generating circuit 125.

Figure 2:
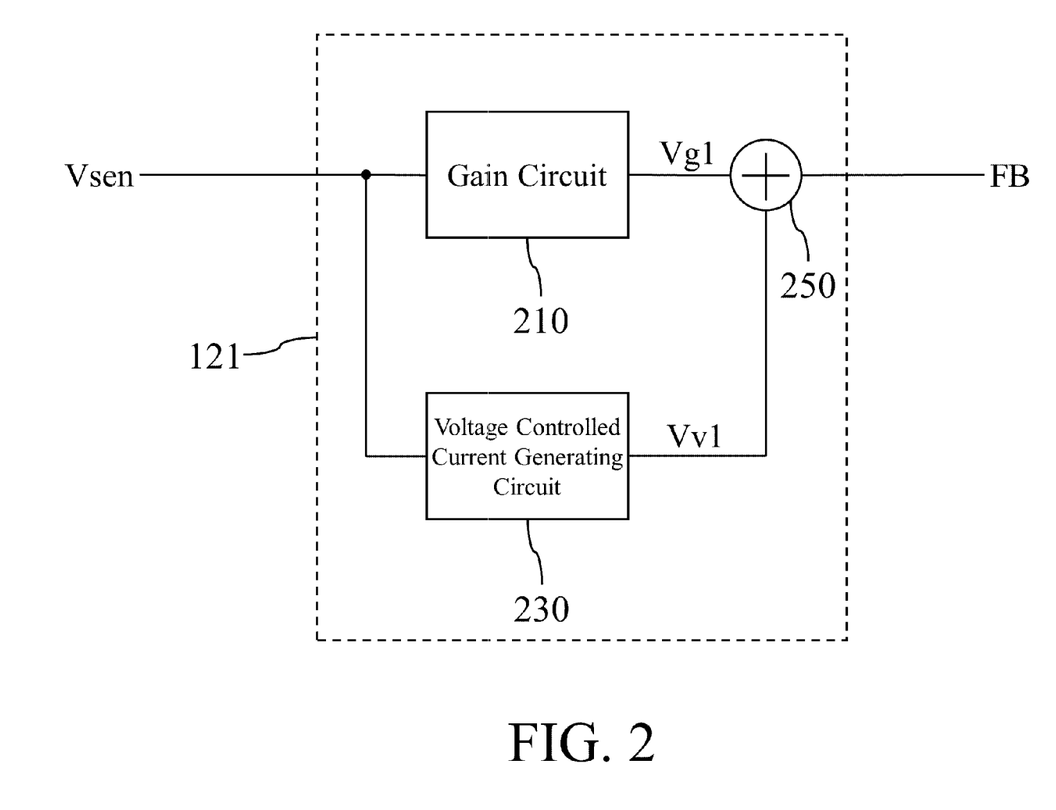
FIG. 2 shows a simplified functional block diagram of the feedback circuit in FIG. 1 according to one embodiment of the present disclosure.

FIG. 2 shows a simplified functional block diagram of the feedback circuit 121 in FIG. 1 according to one embodiment of the present disclosure. In this embodiment, the feedback circuit 121 comprises a gain circuit 210, a voltage controlled current generating circuit 230 and an adder circuit 250. For the purposes of conciseness and clear explanation, other components and connections of the feedback circuit 121 are not shown in FIG. 2.

The gain circuit 210 is configured to operably generate a first gain signal Vg1 according to the voltage sensing signal Vsen.

The voltage controlled current generating circuit 230 is configured to operably generate a second gain signal Vv1 according to the voltage sensing signal Vsen.

The gains of the gain circuit 210 and the voltage controlled current generating circuit 230 may be respectively configured to be positive, negative, greater than 1, less than 1, equal to 1, flat gain and/or different gains in different frequencies for generating the required first gain signal Vg1 and the required second gain signal Vv1 according to the voltage sensing signal Vsen.

The adder circuit 250 is coupled with the gain circuit 210 and the voltage controlled current generating circuit 230, and configured to operably generate the feedback signal FB according to the first gain signal Vg1 and the second gain signal Vv1.

Figure 3:
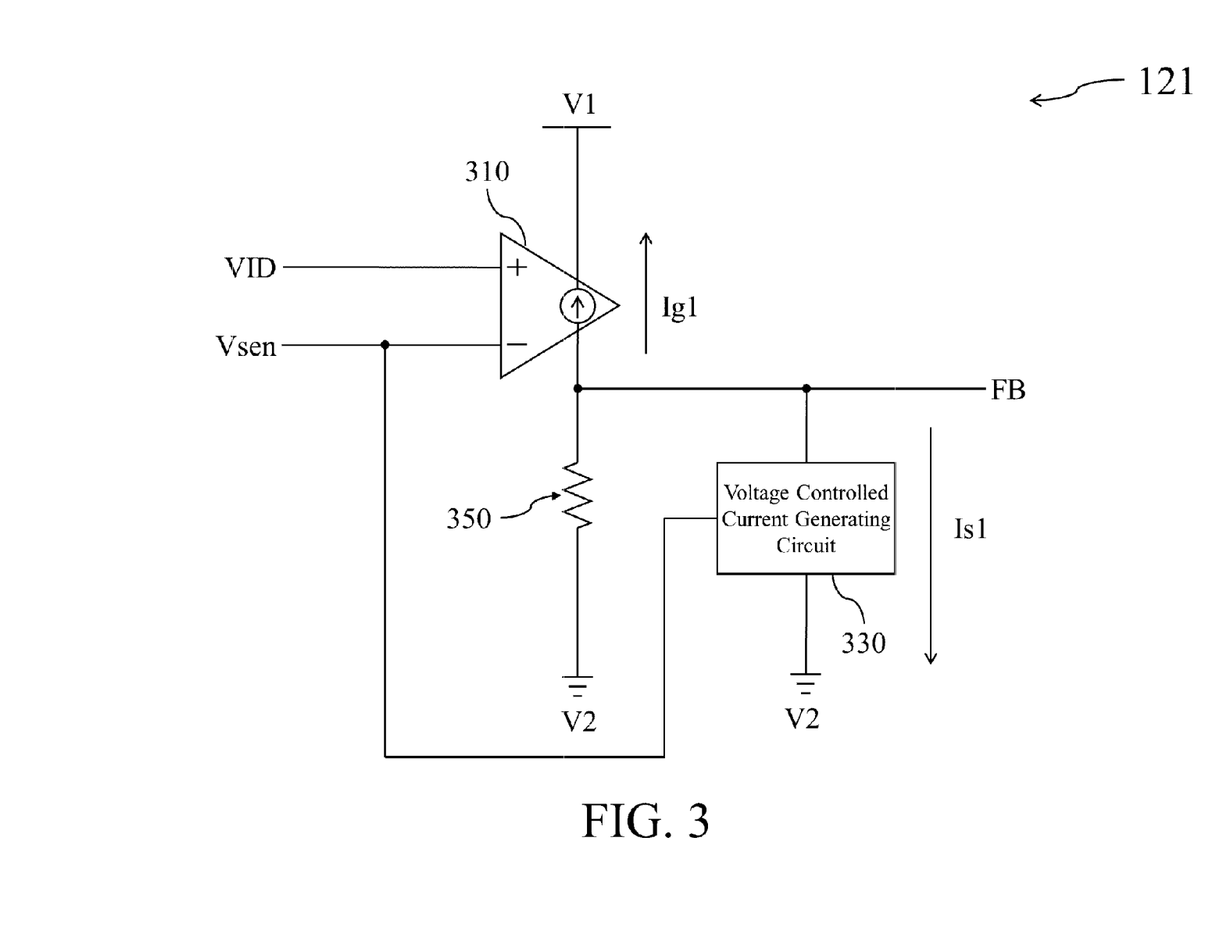
FIG. 3 shows a simplified circuit diagram of the feedback circuit in FIG. 2 according to one embodiment of the present disclosure.

In the embodiment in FIG. 2, each of the functional blocks may be realized with one or more circuit elements and multiple function blocks may be realized with one circuit element. For example, FIG. 3 shows a simplified circuit diagram of the feedback circuit 121 in FIG. 2 according to one embodiment of the present disclosure. The feedback circuit1 121 comprises a first transconductance circuit 310, a voltage controlled current generating circuit 330 and a first resistor 350. In the embodiment in FIG. 3, the feedback circuit 121 may generate the feedback signal FB according to a predetermined voltage signal VID and the voltage sensing signal Vsen. The predetermined voltage signal VID may be generated in the control circuit 120 or received from other signal sources outside the control circuit 120. For example, the feedback circuit 121 may receive a voltage control signal from a CPU to be the predetermined voltage signal VID.

In the embodiments in FIGS. 2 and 3, while the gain circuit 210 generates the first gain signal Vg1 according to the voltage sensing signal Vsen, the first transconductance circuit 310 generates a first transconductance current signal Ig1 according to the voltage sensing signal Vsen to serve as the role of the first gain signal Vg1 in this embodiment. While the voltage controlled current generating circuit 230 generates the second gain signal Vv1 according to the voltage sensing signal Vsen, the voltage controlled current generating circuit 330 generates a first compensation current signal Is1 according to the voltage sensing signal Vsen to serve as the role of the second gain signal Vv1 in this embodiment. While the adder circuit 250 generates the feedback signal FB according to the first gain signal Vg1 and the second gain signal Vv1, the first transconductance current signal Ig1 and the compensation current signal Is1 flow through the first resistor 350 and generate the feedback signal FB in this embodiment.

In the embodiment in FIG. 3, a first output terminal of the first transconductance circuit 310 is coupled with a first terminal of the first resistor 350 and a second terminal of the first transconductance circuit 310 is coupled with a first predetermined voltage level V1 (e.g., a voltage level of 5 volt). The transconductance circuit 210 may generate the first transconductance current signal Ig1 according to the predetermined voltage signal VID and the voltage sensing signal Vsen.

A first terminal of the voltage controlled current generating circuit 330 is coupled with the first terminal of the first resistor 350, and a second terminal of the voltage controlled current generating circuit 330 is coupled with a second predetermined voltage level V2 (e.g., the voltage level of the ground). The voltage controlled current generating circuit 330 may generate the compensation current signal Is1 according to the voltage sensing signal Vsen.

A second terminal of the first resistor 350 is coupled with the second predetermined voltage level V2. The first transconductance current signal Ig1 and the compensation current signal Is1 flow through the first resistor 350 and generate the feedback signal FB at the first terminal of the first resistor 350.

In the embodiment in FIG. 3, the voltage controlled current generating circuit 330 and the first resistor 350 are coupled with the second predetermined voltage level V2. In other embodiments, the voltage controlled current generating circuit 330 and the first resistor 350 may be respectively coupled with the same voltage level, different voltage levels, or other circuits.

Figure 4:
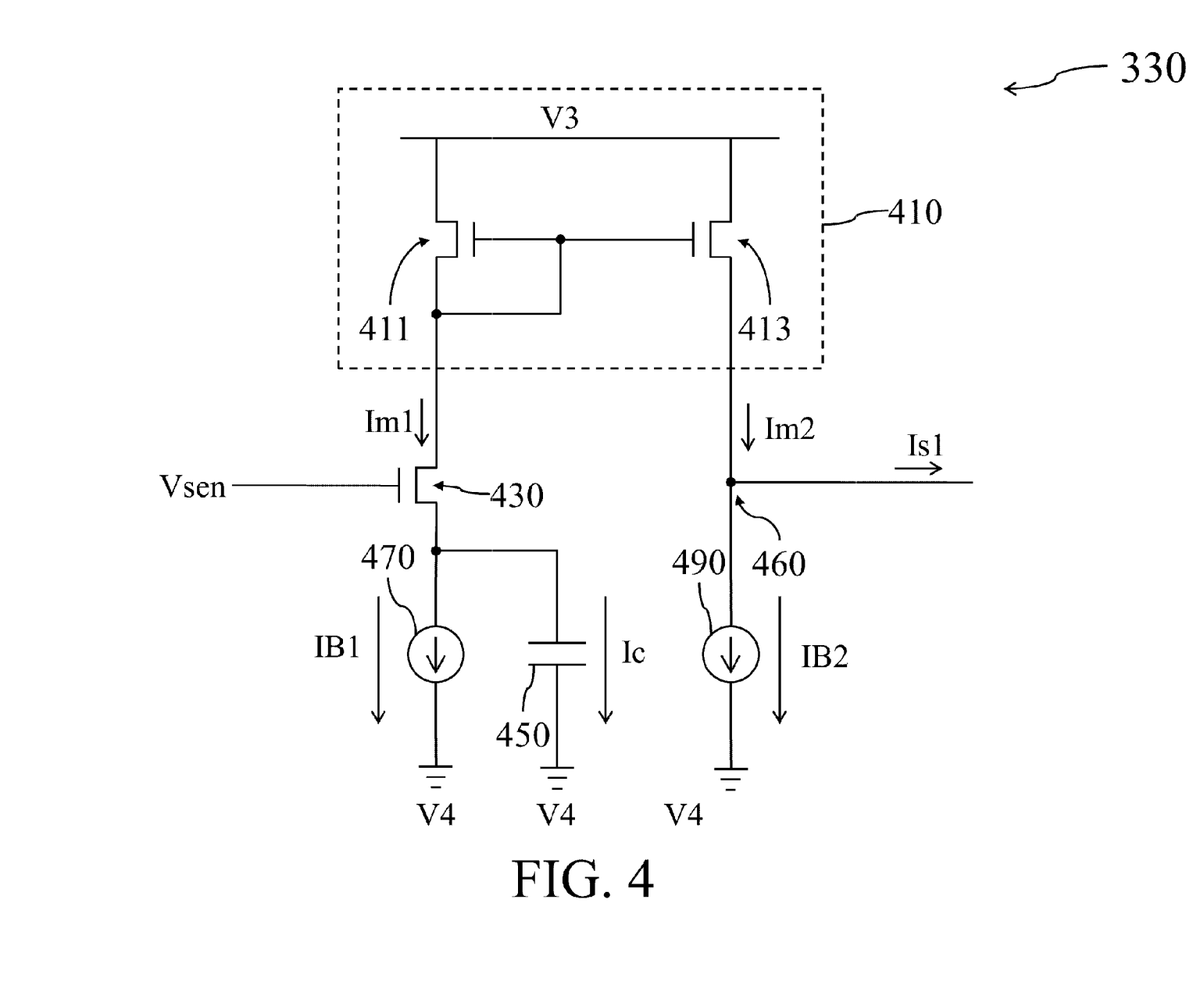
FIG. 4 shows a simplified functional block diagram of the voltage controlled current generating circuit in FIG. 3 according to one embodiment of the present disclosure.

FIG. 4 shows a simplified functional block diagram of the voltage controlled current generating circuit 330 in FIG. 3 according to one embodiment of the present disclosure. In this embodiment, the voltage controlled current generating circuit 330 comprises a current mirror circuit 410, a transistor 430, a capacitor 450 and current source circuits 470 and 490. For the purposes of conciseness and clear explanation, other components and connections of the voltage controlled current generating circuit 330 are not shown in FIG. 3.

In this embodiment, the current mirror circuit 410 comprises transistors 411 and 413 for providing a first current signal Im1 and a second current signal Im2. The second current signal Im2 is configured to be k times the first current signal Im1. For example, the second current signal Im2 may be configured to be k times the first current signal Im1 by configuring the channel width to channel length ration (W/L ratio) of the transistor 413 to be k times the W/L ration of the transistor. In other embodiment, the current mirror circuit 410 may be realized with other suitable circuit structure for providing the required current signals Im1 and Im2.

A first terminal of the transistor 411 is coupled with a third predetermined voltage level V3, and a second terminal of the transistor 411 is coupled with a control terminal of the transistor 411 for providing the first current signal Im1 at the second terminal of the transistor 411.

A first terminal of the transistor 413 is coupled with the third predetermined voltage level V3, and a control terminal of the transistor 413 is coupled with the second terminal and the control terminal of the transistor 411 for providing the second current signal at the second terminal of the transistor 413.

A first terminal of the transistor 430 is coupled with the second terminal of the transistor 411 of the current mirror 410, and a control terminal of the transistor 430 is configured to operably receive the voltage sensing signal Vsen.

A first terminal of the capacitor 450 is coupled with the second terminal of the transistor 430. A second terminal of the capacitor 450 is coupled with a fourth predetermined voltage level V4 and the capacitor 450 may be charged or discharged with a third current signal Ic provided by the transistor 430.

A first terminal of the current source circuit 470 is coupled with the second terminal of the transistor 430 and the first terminal of the capacitor 450. A second terminal of the current source circuit 470 is coupled with the fourth predetermined voltage level V4 for providing a first reference current signal IB1.

A first terminal of the current source circuit 490 is coupled with the second terminal of the transistor 413 of the current mirror circuit 410. A second terminal of the current source circuit 490 is coupled with the fourth predetermined voltage level V4 for providing a second reference current signal IB2. The second reference current signal IB2 providing by the current source circuit 490 is configured to be k times the first reference current signal IB1 provided by the current source circuit 470.

A node 460 is coupled with the second terminal of the transistor 413 of the current mirror circuit 410 and the first terminal of the current source circuit 490 for providing a compensation current signal Is1. For example, the node 460 is coupled with the first terminal of the first resistor 350 in FIG. 3 for providing the compensation current signal Is1.

Because the second current signal Im2 and the second reference current signal IB2 are respectively k times the first current signal Im1 and the first reference current signal IB1, the compensation current signal Is1 is therefore k times the third current signal Ic. The transistor 430 may adjust the value of the first current signal Im1 to adjust the value of the second current signal Im2 according to the voltage sensing signal Vsen for providing the required compensation current signal Is1.

In the embodiment in FIGS. 3 and 4, the transfer function of the feedback circuit 121 may be expressed as $H1(s) = -gm1 \cdot R1 \cdot (1 + S \cdot k \cdot C1/gm1)$, wherein gm1 is the transconductance gain of the first transconductance circuit 310, R1 is the resistance of the first resistor 350, k is the ratio of the first current signal Im1 and the second current signal Im2 and C1 is the capacitance of the capacitor 450. According to the transfer function H1(S), the feedback circuit 121 comprises a first zero at $fz1 = (gm1)/(2\pi \cdot k \cdot C1)$, which is only determined by the capacitance C1 of the capacitor 450, the ratio k of the voltage controlled current generating circuit 330 and the transconductance gain gm1 of the first transconductance circuit 310. The characteristic (e.g., transfer function and frequency response) of the feedback circuit 121 is not influenced by other circuit blocks and therefore adjusting the characteristic of the feedback circuit 121 is very simple and accurate. For example, the first zero fz1 may be easily adjusted by configuring the capacitance C1 of the capacitor 450.

Moreover, when the zero fz1 and the transconductance gain gm1 of the first transconductance circuit 310 are fixed, the capacitor 450 may be realized with a capacitor with a smaller capacitance by increasing the ratio k of the voltage controlled current generating circuit 330. The characteristic of the feedback circuit 121 is not affected and the hardware complexity of the capacitor 450 may be reduced when realized with the integrated circuit elements. It may therefore be configured to adapt to the integrated circuit implementation more easily.

Because the transfer function of the feedback circuit 121 is only determined by the capacitance C1 of the capacitor 450, the ratio k of the voltage controlled current generating circuit 330 and the transconductance gain gm1 of the first transconductance circuit 310, the characteristic of the feedback circuit 121 is not affected (or only slightly affected) when coupled with other circuit blocks. Thus, the feedback circuit 121 may provide the required characteristic.

Figure 5:
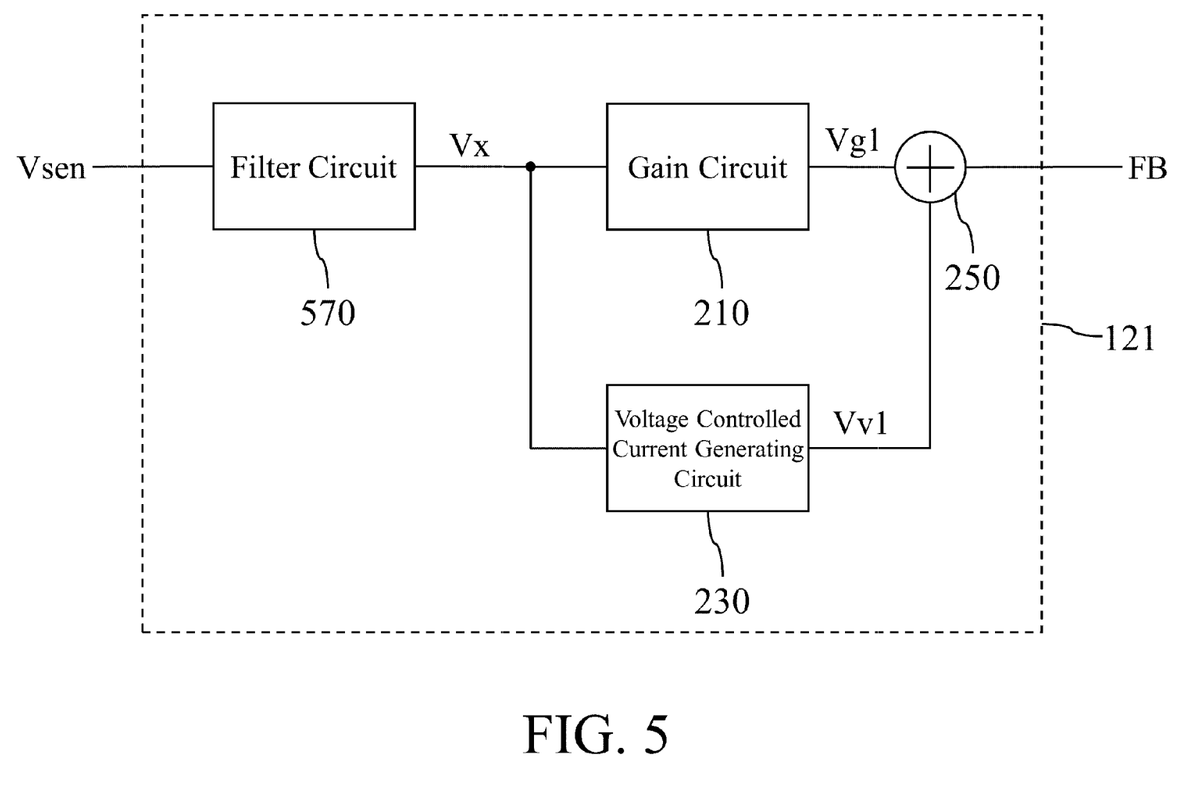
FIG. 5 shows a simplified functional block diagram of the feedback circuit in FIG. 1 according to another embodiment of the present disclosure.

FIG. 5 shows a simplified functional block diagram of the feedback circuit 121 in FIG. 1 according to another embodiment of the present disclosure. In this embodiment, the feedback circuit 121 comprises the gain circuit 210, the voltage controlled current generating circuit 230, the adder circuit 250 and a first filter circuit 570. The embodiment in FIG. 5 is similar to the embodiment in FIG. 2, one of the differences is the first filter circuit 570 is coupled with the gain circuit 210 and the voltage controlled current generating circuit 230 for providing the filtering function.

The first filter circuit 570 is configured to operably generate a first filter voltage signal Vx according to the voltage sensing signal Vsen. The gain circuit 210 is coupled with the first filer circuit 570 for generating the first gain signal Vg1 according to the first filter voltage signal Vx. The voltage controlled current generating circuit 230 is coupled with the first filter circuit 570 for generating the second gain signal Vv1 according to the first filter voltage signal Vx. The adder circuit 250 is coupled with the gain circuit 210 and the voltage controlled current generating circuit 230 for generating the feedback signal FB according to the first gain signal Vg1 and the second gain signal Vv1.

Figure 6:
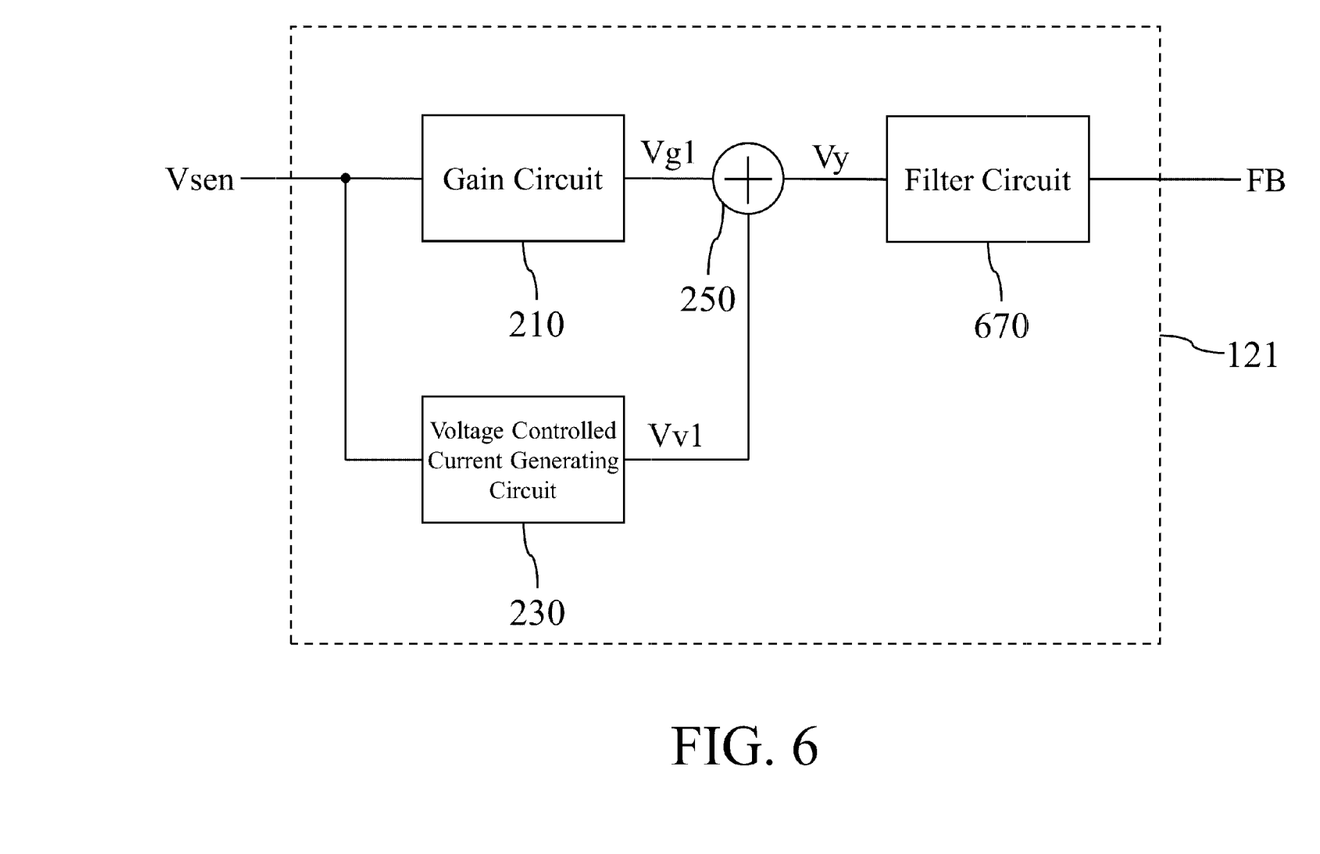
FIG. 6 shows a simplified functional block diagram of the feedback circuit in FIG. 1 according to another embodiment of the present disclosure.

FIG. 6 shows a simplified functional block diagram of the feedback circuit 121 in FIG. 1 according to another embodiment of the present disclosure. In this embodiment, the feedback circuit 121 comprises the gain circuit 210, the voltage controlled current generating circuit 230, the adder circuit 250 and a second filter circuit 670. The embodiment in FIG. 6 is similar to the embodiment in FIG. 2, one of the differences is the second filter circuit 670 is coupled with the adder circuit 250 for providing the filtering function.

The gain circuit 210 is configured to generate the first gain voltage signal Vg1 according to the voltage sensing signal Vsen. The voltage controlled current generating circuit 230 is configured to generate the second gain signal Vv1 according to the voltage sensing signal Vsen. The adder circuit 250 is coupled with the gain circuit 210 and the voltage controlled current generating circuit 230 for generating a second filter voltage signal Vy according to the first gain signal Vg1 and the second gain signal Vv1. The filter circuit 670 is coupled with the adder circuit 250 for generating the feedback signal FB according to the filter voltage signal Vy.

Figure 7:
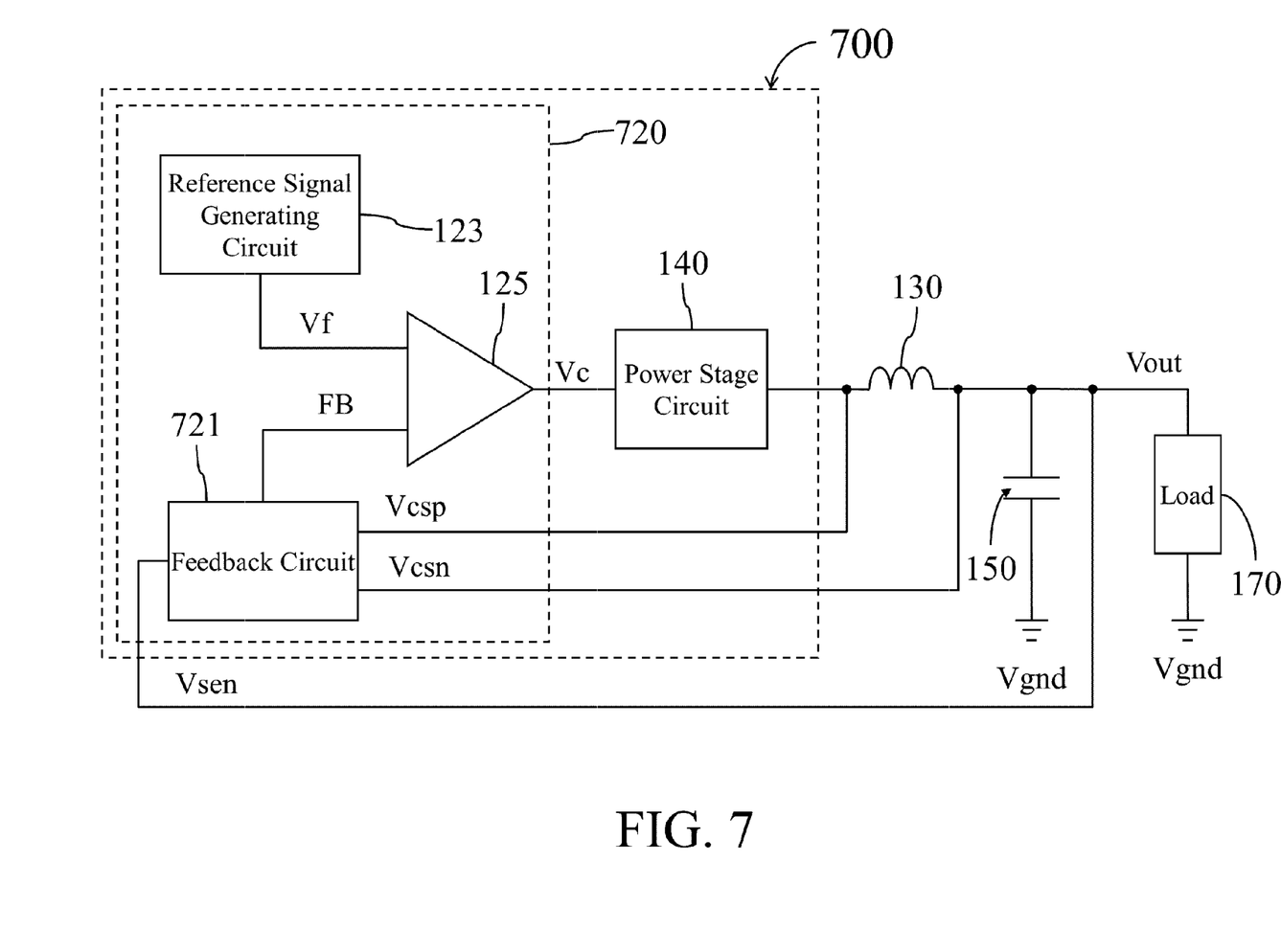
FIG. 7 shows a simplified functional block diagram of a power converter circuit according to another embodiment of the present disclosure.

FIG. 7 shows a simplified functional block diagram of a power converter circuit 720 according to another embodiment of the present disclosure. The power converter circuit 700 comprises a control circuit 720 and a power stage circuit 140. The control circuit 720 comprises a feedback circuit 721, the reference signal generating circuit 123 and the pulse width modulation signal generating circuit 125. The embodiment in FIG. 7 is similar to the embodiment in FIG. 1, one of the differences is the feedback circuit 721 is configured to operably generate the feedback signal FB according to the voltage sensing signal Vsen, a first channel current sensing signal Vcsp and a second channel current sensing signal Vcsn. The reference signal generating circuit 123, the pulse width modulation signal generating circuit 125 and the power stage circuit 140 may be realized with the same or similar embodiments described above, and the implementation, the operations and the functions thereof are not repeated for the purpose of conciseness. For the purposes of conciseness and clear explanation, other components and connections of the power converter circuit 700 are not shown in FIG. 7.

Figure 8:
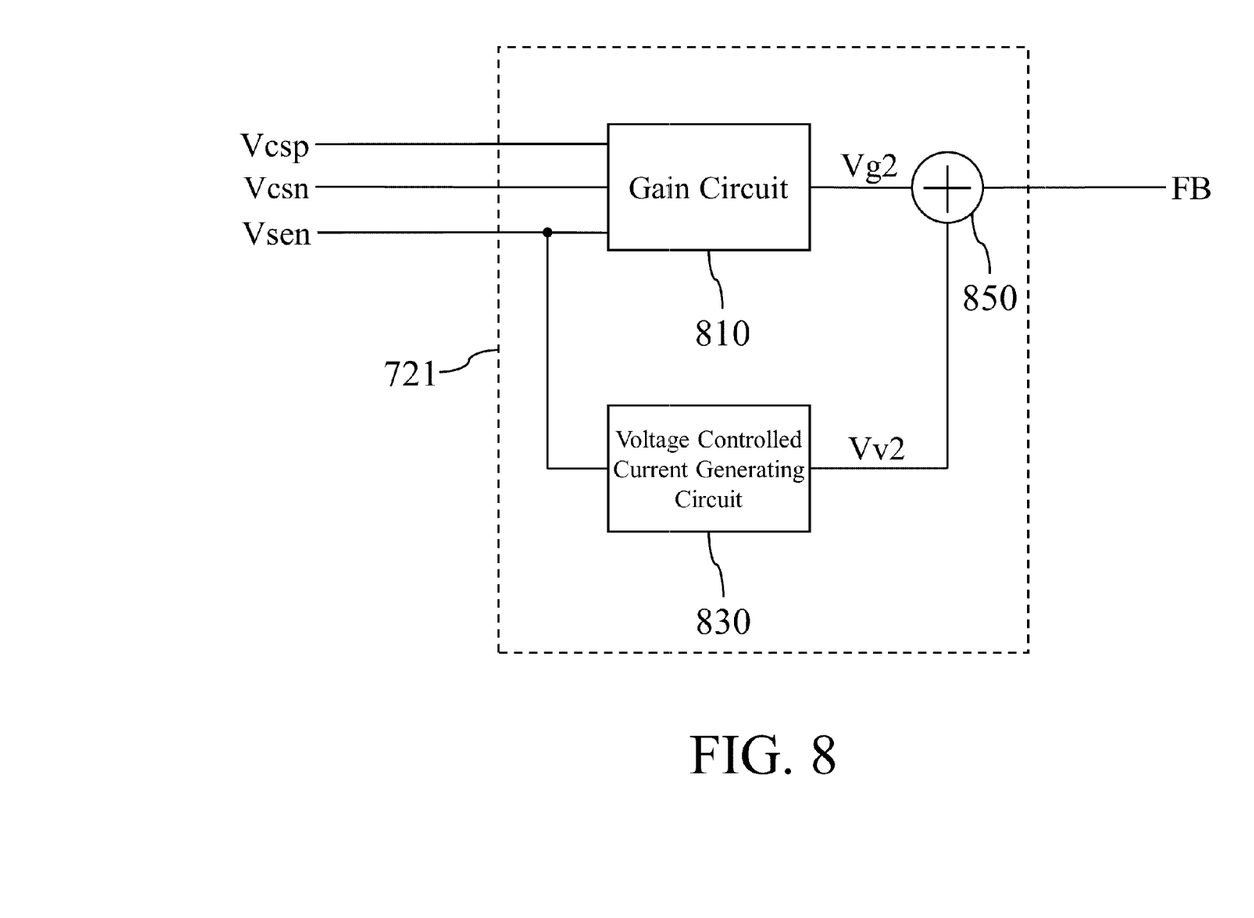
FIG. 8 shows a simplified functional block diagram of the feedback circuit in FIG. 7 according to one embodiment of the present disclosure.

FIG. 8 shows a simplified functional block diagram of the feedback circuit 721 in FIG. 7 according to one embodiment of the present disclosure. In this embodiment, the feedback circuit 721 comprises a gain circuit 810, a voltage controlled current generating circuit 830 and an adder circuit 850. For the purposes of conciseness and clear explanation, other components and connections of the feedback circuit 721 are not shown in FIG. 8.

The gain circuit 810 is configured to operably generate a third gain signal Vg2 according to the voltage sensing signal Vsen, the first channel current sensing signal Vcsp and the second channel current sensing signal Vcsn.

The voltage controlled current generating circuit 830 is configured to operably generate a fourth gain signal Vv2 according to the voltage sensing signal Vsen.

The adder circuit 850 is coupled with the gain circuit 810 and the voltage controlled current generating circuit 830, and is configured to operably generate the feedback signal FB according to the third gain signal Vg2 and the fourth gain signal Vv2.

Figure 9:
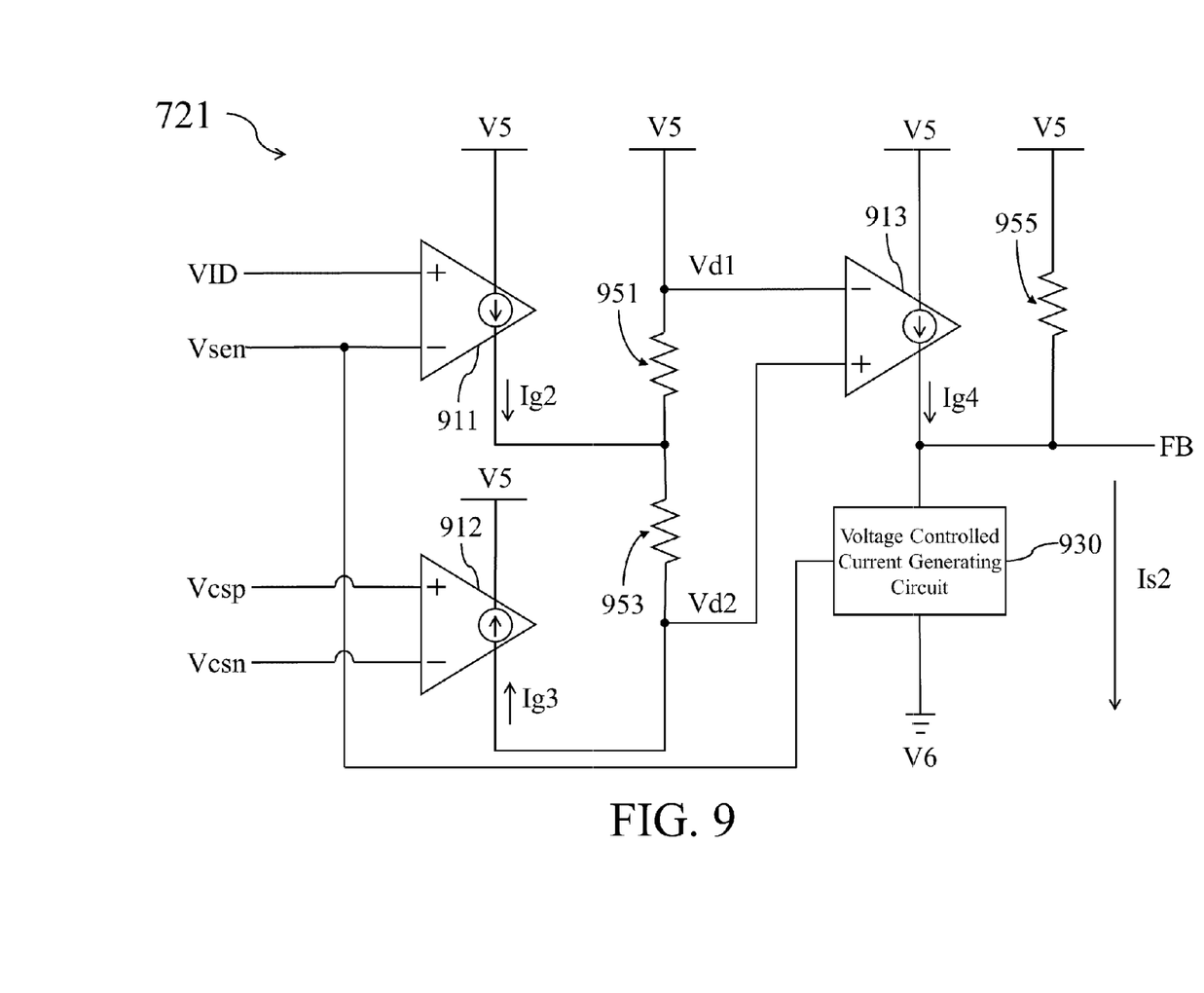
FIG. 9 shows a simplified circuit diagram of the feedback circuit in FIG. 8 according to one embodiment of the present disclosure.

In the embodiment in FIG. 8, each of the functional blocks may be realized with one or more circuit elements and multiple function blocks may be realized with one circuit element. For example, FIG. 9 shows a simplified circuit diagram of the feedback circuit 721 in FIG. 8 according to one embodiment of the present disclosure. The feedback circuit 721 comprises a second transconductance circuit 911, a third transconductance circuit 912, a fourth transconductance circuit 913, a voltage controlled current generating circuit 930, a second resistor 951, a third resistor 953 and a fourth resistor 955. In the embodiment in FIG. 9, the feedback circuit 721 is configured to operably generate the feedback signal FB according to the predetermined voltage signal VID, the voltage sensing signal Vsen, the first channel current sensing signal Vcsp and the second channel current sensing signal Vcsn.

In the embodiments in FIGS. 8 and 9, while the gain circuit generates the third gain signal Vg2 according to the voltage sensing signal Vsen, the first channel current sensing signal Vcsp and the second channel current sensing signal Vcsn, the transconductance circuits 911, 912 and 913 generates a fourth transconductance current signal Ig4 to serve as the role of the third gain signal Vg2 in this embodiment according to the voltage sensing signal Vsen, the first channel current sensing signal Vcsp and the second channel current sensing signal Vcsn. While the voltage controlled current generating circuit 830 generates the fourth gain signal Vv2 according to the voltage sensing signal Vsen, the voltage controlled current generating circuit 940 generates a second compensation current signal Is2 to serve as the role of the fourth gain signal Vv2 in this embodiment according to the voltage sensing signal Vsen. While the adder circuit 850 generates the feedback signal FB according to the third gain signal Vg2 and the fourth gain signal Vv2, the fourth transconductance current signal Ig4 and the second compensation current signal Is1 flow through the fourth resistor 955 and generate the feedback signal FB in this embodiment.

A first output terminal of the second transconductance circuit 911 is coupled with a first terminal of the second resistor 951 and a first terminal of the third resistor 953. A second output terminal of the second transconductance circuit 911 is coupled with a fifth predetermined voltage level V5 and configured to operably generate a second transconductance current signal Ig2 according to the voltage sensing signal Vsen and the predetermined voltage signal VID.

A first output terminal of the third transconductance circuit 912 is coupled with a second terminal of the third resistor 953. A second output terminal of the third transconductance circuit 912 is coupled with the fifth predetermined voltage level V5 and configured to operably generate a third transconductance current signal Ig3 according to the first channel current sensing signal Vcsp and the second channel current sensing signal Vcsn.

A first output terminal of the fourth transconductance circuit 913 is coupled with a first terminal of the fourth resistor 955. A second output terminal of the fourth transconductance circuit 913 is coupled with the fifth predetermined voltage level V5 and configured to operably generate the fourth transconductance current signal Ig4 according to a first voltage signal Vd1 at a second terminal of the second resistor 951 and a second voltage signal Vd2 at the second terminal of the third resistor 953.

A first terminal of the voltage controlled current generating circuit 930 is coupled with the first terminal of the fourth resistor 955 and the first output terminal of the fourth transconductance circuit 913. A second terminal of the voltage controlled current generating circuit 930 is coupled with a sixth predetermined voltage level V6 and configured to operably generate the second compensation current signal Is2 according to the voltage sensing signal Vsen. The voltage controlled current generating circuit 930 may be realized with the implementation similar to the voltage controlled current generating circuit 330 in FIG. 4 or other suitable circuit structures.

The fourth transconductance current signal Ig4 and the second compensation current signal Is2 flow through the fourth resistor 955 and generate the feedback signal FB at the first terminal of the fourth resistor 955.

In the embodiment in FIG. 9, the transconductance circuits 911, 912 and 913 and the resistors 951 and 955 are coupled with the fifth predetermined voltage level V5. In other embodiments, the transconductance circuits 911, 912 and 913 and the resistors 951 and 955 may be respectively coupled with the same voltage level, different voltage levels, or other circuits.

When the voltage controlled current generating circuit 930 is realized with the voltage controlled current generating circuit 330 in FIG. 4, the transfer function of the feedback circuit 721 may be expressed as $H2(S)=-gm2 \cdot gm3 \cdot R2 \cdot R3 \cdot (1+(S \cdot k \cdot C1)/(gm2 \cdot gm3 \cdot R2))$, wherein gm2 is the transconductance gain of the second transconductance circuit 911, gm3 is the transconductance gain of the fourth transconductance circuit 913, R2 is the resistance of the second resistor 951, R3 is the resistance of the fourth resistor 955, k is the ratio of the first current signal Im1 and the second current signal Im2 of the voltage controlled current generating circuit 330 and C1 is the capacitance of the capacitor 450.

According to the transfer function H2(S), the feedback circuit 721 comprises a second zero at $fz2=(gm2 \cdot gm3 \cdot R2)/(2\pi \, k \cdot C1)$, which is only determined by the resistance R2 of the second resistor 951, the ratio k of the voltage controlled current generating circuit 330, the capacitance C1 of the capacitor 450, the transconductance gain gm2 of the second transconductance circuit 911 and the transconductance gain gm3 of the fourth transconductance circuit 913. The characteristic (e.g., transfer function and frequency response) of the feedback circuit 721 is not influenced by other circuit blocks and therefore adjusting the characteristic of the feedback circuit 721 is very simple and accurate. For example, the second zero fz2 may be easily adjusted by configuring the resistance R2 of the second resistor 951 and/or the capacitance C1 of the capacitor 450.

Moreover, when the zero fz2, the resistance R2 of the second resistor 951, the transconductance gain gm2 of the second transconductance circuit 911 and the transconductance gain gm3 of the fourth transconductance circuit 913 are fixed, the capacitor 450 may be realized with a capacitor with a smaller capacitance by increasing the ratio k of the voltage controlled current generating circuit 330. The characteristic of the feedback circuit 721 is not affected and the hardware complexity of the capacitor 450 may be reduced when realized with the integrated circuit elements. It may therefore be configured to adapt to the integrated circuit implementation more easily.

In the embodiments in FIGS. 7-9, the feedback circuit 721 may be realized with the structure similar to embodiments in FIGS. 5 and 6 for cooperating with other circuit blocks. Because the transfer function of the feedback circuit 721 is only determined by the resistance R2 of the second resistor 951, the ratio k of the voltage controlled current generating circuit 330, the capacitance C1 of the capacitor 450, the transconductance gain gm2 of the second transconductance circuit 911 and the transconductance gain gm3 of the fourth transconductance circuit 913, the characteristic of the feedback circuit 721 is not affected (or only slightly affected) when coupled with other circuit blocks. Thus, the feedback circuit 721 may provide the required characteristic.

Figure 10:
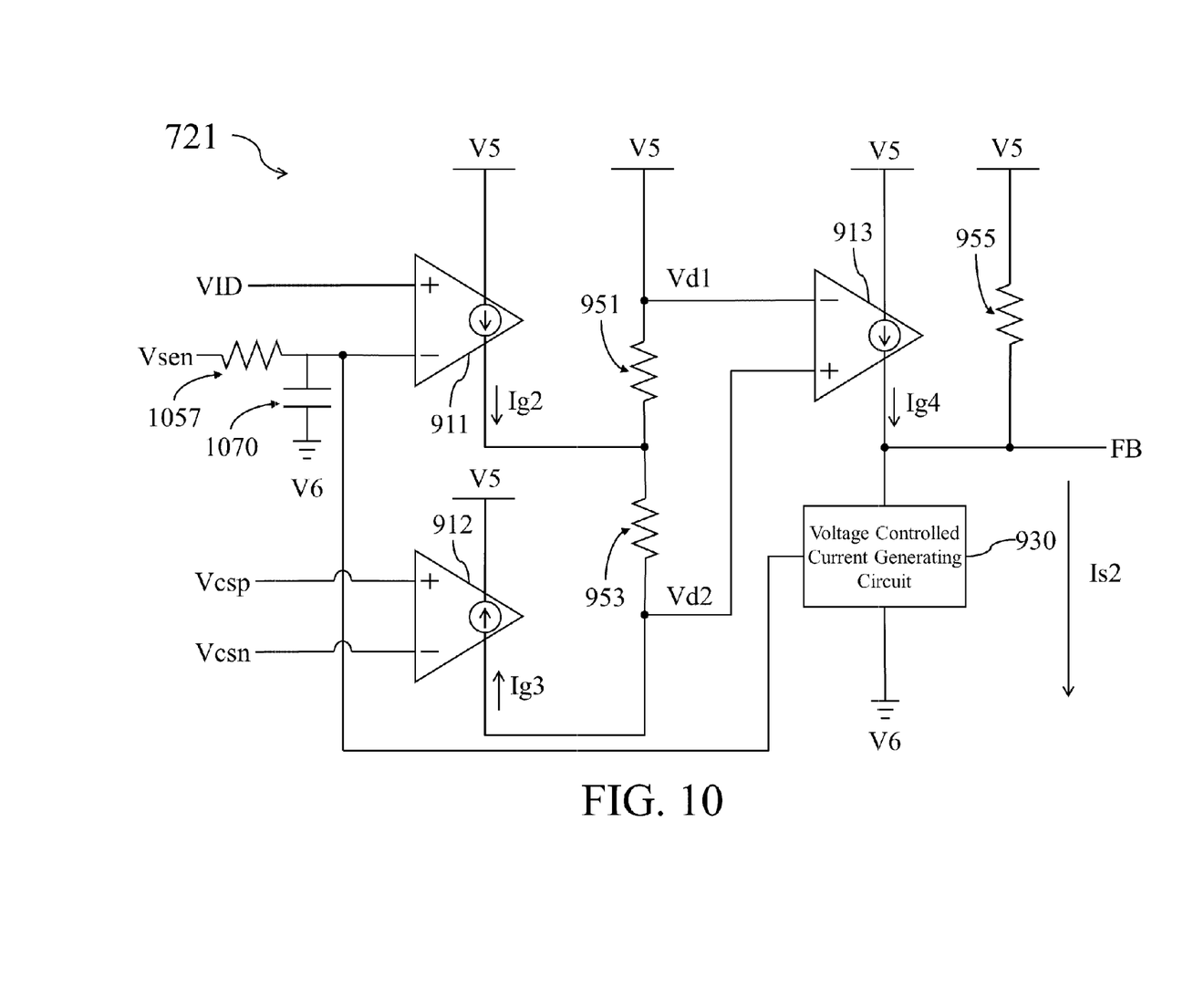
FIG. 10 shows a simplified circuit diagram of the feedback circuit in FIG. 8 according to another embodiment of the present disclosure.

FIG. 10 shows a simplified circuit diagram of the feedback circuit in FIG. 8 according to another embodiment of the present disclosure. The feedback circuit 721 comprises the second transconductance circuit 911, the third transconductance circuit 912, the fourth transconductance circuit 913, the voltage controlled current generating circuit 930, the second resistor 951, the third resistor 953, the fourth resistor 955, a fifth resistor 1057 and a capacitor 1070. The embodiment in FIG. 10 is similar to the embodiment in FIG. 9, one of the differences is the additional circuit of the resistor 1057 and the capacitor 1070 in FIG. 10.

When the voltage controlled current generating circuit 930 is realized with the voltage controlled current generating circuit 330 in FIG. 4, the transfer function of the feedback circuit 721 may be expressed as $H6(S)=-gm2 \cdot gm3 \cdot R2 \cdot R3 \cdot (1+(S \cdot k \cdot C1)/(gm2 \cdot gm3 \cdot R2)) \cdot (1/(1+S \cdot R4 \cdot C2))$, wherein gm2 is the transconductance gain of the second transconductance circuit 911, gm3 is the transconductance gain of the fourth transconductance circuit 913, R2 is the resistance of the second resistor 951, R3 is the resistance of the fourth resistor 955, R4 is the resistance of the fifth resistor 1057, k is the ratio of the first current signal Im1 and the second current signal Im2 of the voltage controlled current generating circuit 330, C1 is the capacitance of the capacitor 450 and C2 is the capacitance of the capacitor 1070.

According to the transfer function H2(S), the feedback circuit 721 comprises the second zero at $fz2=(gm2 \cdot gm3 \cdot R2)/(2\pi \cdot k \cdot C1)$ and a pole $fp=1/(2\pi \cdot R4 \cdot C2)$. The second zero fz2 is only determined by the resistance R2 of the second resistor 951, the ratio k of the voltage controlled current generating circuit 330, the capacitance C1 of the capacitor 450, the transconductance gain gm2 of the second transconductance circuit 911 and the transconductance gain gm3 of the fourth transconductance circuit 913. The pole fp is only determined by the resistance R4 of the fifth resistor 1057 and the capacitance C2 of the capacitor 1070. The second zero fz2 and the pole fp may therefore be adjusted independently. The characteristic (e.g., transfer function and frequency response) of the feedback circuit 721 is not influenced by other circuit blocks and therefore adjusting the characteristic of the feedback circuit 721 is very simple and accurate.

In the above embodiments, the single channel power converter circuits 100 and 700 are utilized are clear explanation. In other embodiments, the feedback circuits may be utilized in multiple channel power converters. For example, the feedback circuit 721 may be configured to operably generate the feedback signal FB according to the voltage sensing signal Vsen and the channel sensing current signals Vcsp and Vcsn from multiple channels.

In the above embodiments, the buck converter circuits 100 and 700 are utilized are clear explanation. In other embodiments, the feedback circuits may be utilized in other types of power converters for providing the required feedback signal FB, e.g., boost power converters and buck-boost power converters.

In the above embodiments, according to the transfer function of the feedback circuit, the zero and the pole of the feedback circuit may be adjusted independently. The characteristic (e.g., transfer function and frequency response) of the feedback circuit is not influenced by other circuit blocks and therefore adjusting the characteristic of the feedback circuit is very simple and accurate.

In the above embodiments, the capacitor may be realized with a capacitor with a smaller capacitance by increasing the ratio k of the voltage controlled current generating circuit. The characteristic of the feedback circuit is not affected and the hardware complexity of the capacitor may be reduced when realized with the integrated circuit elements. It may therefore be configured to adapt to the integrated circuit implementation more easily.

Moreover, when the feedback circuit is realized with integrated circuit element, the pin number of the integrated circuit package may be reduced. Thus, a compact integrated circuit package may be utilized to effectively reduce the dimension of the electronic devices.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

The term "voltage signal" used throughout the description and the claims may be expressed in the format of a current in implementations, and the term "current signal" used throughout the description and the claims may be expressed in the format of a voltage in implementations.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit for a power converter, for configuring a power stage circuit to provide power to a load, comprising:
    a feedback circuit, configured to operably generate a first gain signal and a second gain signal according to a voltage sensing signal coupled with a load and generate a feedback signal according to the first gain signal and the second gain signal; and
    a pulse width modulation signal generating circuit, coupled with the feedback circuit, configured to operably configure the power stage circuit according to the feedback signal and a reference signal;
wherein the feedback circuit and the pulse width modulation signal generating circuit are configured in the same integrated circuit package,
wherein the feedback circuit further comprises:
    a first transconductance circuit, comprising a first output terminal for coupling with a first terminal of a first resistor and comprising a second terminal for coupling with a first predetermined voltage level, configured to operably generate a first transconductance current signal to be the first gain signal according to the voltage sensing signal; and
    a voltage controlled current generating circuit, coupled with the first terminal of the first resistor, configured to operably generate a first compensation current signal to be the second gain signal according to the voltage sensing signal;
wherein the feedback circuit generate the feedback signal at the first terminal of the first resistor according to the first transconductance current signal and the first compensation current signal, and
wherein the voltage controlled current generating circuit further comprises:
    a current mirror circuit comprising a first terminal configured to operably provide a first current signal and comprising a second terminal configured to operably provide a second current signal;
    a transistor comprising a first terminal, a second terminal and a control terminal wherein the first terminal of the transistor is coupled with the first terminal of the current mirror circuit and the control terminal of the transistor is configured to operably receive the voltage sensing signal;
    a capacitor comprising a first terminal for coupling with the second terminal of the transistor and comprising a second terminal for coupling with a fourth predetermined voltage level;
    a first current source circuit, comprising a first terminal coupled with the second terminal of the transistor and comprising a second terminal for coupling with the fourth predetermined voltage level, configured to operably generate a first reference current signal;
    a second current source circuit, comprising a first terminal coupled with the second terminal of the current mirror circuit and comprising a second terminal for coupling with the fourth predetermined voltage level, configured to operably generate a second reference current signal;
    wherein the voltage controlled current generating circuit generate the first compensation current signal at a node coupled between the second terminal of the current mirror circuit and the first terminal of the second current source circuit; the transistor is configured to operably output a third current signal from the second terminal of the transistor to the capacitor; the second reference current signal is configured to be k times the first reference signal; the second current signal is configured to be k times the first current signal; and the first compensation current signal is configured to be k times the third current signal.

2. The control circuit of claim 1, wherein the feedback circuit further comprises a first zero equal to $(gm1)/(2\pi \cdot k \cdot C1)$, wherein gm1 is a transconductance gain of the firs transconductance circuit and C1 is a capacitance of the capacitor.

3. The control circuit of claim 1, wherein the feedback circuit further comprises:
a voltage controlled current generating circuit configured to operably generate a first compensation current signal to be the second gain signal according to the voltage sensing signal.

4. The control circuit of claim 1, wherein the feedback circuit further comprises:
a first filter circuit configured to operably generate a first filter voltage signal by filtering the voltage sensing signal;
wherein the feedback circuit generates the first gain signal and the second gain signal according to the first filter voltage signal and generates the feedback signal according to the first gain signal and the second gain signal.

5. The control circuit of claim 1, wherein the feedback circuit further comprises:
a first filter circuit configured to operably generate the feedback signal by filtering the first gain signal and the second gain signal.

6. A control circuit for a power converter, for configuring a power stage circuit to provide power to a load through a inductor, comprising:
a feedback circuit, configured to operably generate a third gain signal and a fourth gain signal according to a voltage sensing signal coupled with a load, a first channel current sensing signal and a second channel current sensing signal, and generate a feedback signal according to the third gain signal and the fourth gain signal; and
a pulse width modulation signal generating circuit, coupled with the feedback circuit, configured to operably configure the power stage circuit according to the feedback signal and a reference signal;
wherein the feedback circuit and the pulse width modulation signal generating circuit are configured in the same integrated circuit package,
wherein the feedback circuit further comprises:
a second transconductance circuit, comprising an output terminal for coupling with a first terminal of a second resistor and a first terminal of a third resistor, configured to operably generate a second transconductance current signal at the output terminal of the second transconductance circuit according to the voltage sensing signal;
a third transconductance circuit, comprising a output terminal for coupling with a second terminal of a third resistor, configured to operably generate a third transconductance signal at the output terminal of the third transconductance circuit according to the first channel current sensing signal and the second channel current sensing signal;
a fourth transconductance circuit, comprising a output terminal for coupling with a first terminal of a fourth resistor, configured to operably generate a fourth transconductance current signal to be the third gain signal at the output terminal of the fourth transconductance circuit according to a first voltage signal at a second terminal of the second resistor and according to a second voltage signal at the second terminal of the third resistor; and
a voltage controlled current generating circuit, coupled with the first terminal of the fourth resistor, configured to operably generate a second compensation current signal to be the fourth gain signal according to the voltage sensing signal;
wherein the feedback circuit generate the feedback signal at the first terminal of the fourth resistor according to the fourth transconductance current signal and the second compensation current signal.

7. The control circuit of claim 6, wherein the voltage controlled current generating circuit further comprises:
a current mirror circuit comprising a first terminal configured to operably provide a first current signal and comprising a second terminal configured to operably provide a second current signal;
a transistor comprising a first terminal, a second terminal and a control terminal wherein the first terminal of the transistor is coupled with the first terminal of the current mirror circuit and the control terminal of the transistor is configured to operably receive the voltage sensing signal;
a capacitor comprising a first terminal for coupling with the second terminal of the transistor and comprising a second terminal for coupling with a fourth predetermined voltage level;
a first current source circuit, comprising a first terminal coupled with the second terminal of the transistor and comprising a second terminal for coupling with the fourth predetermined voltage level, configured to operably generate a first reference current signal;
a second current source circuit, comprising a first terminal coupled with the second terminal of the current mirror circuit and comprising a second terminal for coupling with the fourth predetermined voltage level, configured to operably generate a second reference current signal;
wherein the voltage controlled current generating circuit generate the second compensation current signal at a node coupled between the second terminal of the current mirror circuit and the first terminal of the second current source circuit; the transistor is configured to operably output a third current signal from the second terminal of the transistor to the capacitor; the second reference current signal is configured to be k times the first reference signal; the second current signal is configured to be k times the first current signal; and the second compensation current signal is configured to be k times the third current signal.

8. The control circuit of claim 7, wherein the feedback circuit further comprises a second zero equal to $(gm2 \cdot gm3 \cdot R2)/(2\pi \cdot k \cdot C1)$, wherein gm2 is a transconductance gain of the second transconductance circuit, gm3 is a transconductance of the fourth transconductance circuit, R2 is a resistance of the second resistor and C2 is a capacitance of the capacitor.

9. The control circuit of claim 6, wherein the feedback circuit further comprises:
a voltage controlled current generating circuit, coupled with the first terminal of the fourth resistor, configured to operably generate a second compensation current signal to be the fourth gain signal according to the voltage sensing signal.

10. The control circuit of claim 6, wherein the feedback circuit further comprises:
a first filter circuit configured to operably generate a first filter voltage signal by filtering the voltage sensing signal;
wherein the feedback circuit generates the third gain signal and the fourth gain signal according to the first filter voltage signal, the first channel current sensing signal and the second channel current sensing signal, and generates the feedback signal according to the third gain signal and the fourth gain signal.

11. The control circuit of claim 6, wherein the feedback circuit further comprises:
  a second filter circuit configured to operably generate the feedback signal by filtering the third gain signal and the fourth gain signal.

\* \* \* \* \*